United States Patent
Toda

(10) Patent No.: US 10,844,462 B2
(45) Date of Patent: Nov. 24, 2020

(54) SLIDE MATERIAL AND METHOD FOR MANUFACTURING SAME, AND SLIDE MEMBER

(71) Applicant: DAIDO METAL COMPANY LTD., Aichi (JP)

(72) Inventor: Kazuaki Toda, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 59 days.

(21) Appl. No.: 16/336,534

(22) PCT Filed: Jun. 8, 2017

(86) PCT No.: PCT/JP2017/021350
§ 371 (c)(1),
(2) Date: Mar. 26, 2019

(87) PCT Pub. No.: WO2018/061332
PCT Pub. Date: Apr. 5, 2018

(65) Prior Publication Data
US 2019/0218646 A1    Jul. 18, 2019

(30) Foreign Application Priority Data

Sep. 30, 2016  (JP) ................................. 2016-194266

(51) Int. Cl.
*C22C 9/00* (2006.01)
*B32B 15/01* (2006.01)
(Continued)

(52) U.S. Cl.
CPC ............... *C22C 9/00* (2013.01); *B22D 13/02* (2013.01); *B22D 19/00* (2013.01); *B22D 19/16* (2013.01);
(Continued)

(58) Field of Classification Search
None
See application file for complete search history.

(56) References Cited

U.S. PATENT DOCUMENTS 8,623,517 B2 *   1/2014   Sato ........................ B22F 9/082
                                                                   428/677
9,074,629 B2 *   7/2015   Yamauchi .............. F16C 33/206

FOREIGN PATENT DOCUMENTS

JP   2001-81523 A    3/2001
JP   2002-285262 A   10/2002
(Continued)

OTHER PUBLICATIONS

International Search Report issued in corresponding International Application No. PCT/JP2017/021350, dated Jul. 11, 2017, 3 pages.

*Primary Examiner* — Daniel J. Schleis
(74) *Attorney, Agent, or Firm* — Snyder, Clark, Lesch & Chung, LLP

(57) ABSTRACT

Provided are a slide material in which the joining strength between a Bi-containing copper alloy layer and a substrate is improved, and a method for manufacturing the slide material. The slide material according to the present invention has a substrate and a copper alloy layer. The copper alloy layer comprises a copper alloy containing 4.0-25.0 mass % of Bi and has a structure in which Bi phases are scattered in a copper alloy structure. The contact area ratio of Bi phases of the copper alloy layer at the joining interface with the substrate is not more than 2.0%. The slide material is manufactured by casting a molten copper alloy onto a substrate and causing the copper alloy to solidify unidirectionally.

11 Claims, 3 Drawing Sheets

(51) Int. Cl.
*B22D 19/16* (2006.01)
*F16C 33/12* (2006.01)
*F16C 33/14* (2006.01)
*B22D 27/04* (2006.01)
*C22C 9/05* (2006.01)
*C22C 1/02* (2006.01)
*C22C 9/01* (2006.01)
*C22C 9/06* (2006.01)
*C22C 9/10* (2006.01)
*B22D 13/02* (2006.01)
*C22C 9/02* (2006.01)
*B22D 19/00* (2006.01)
*C22C 1/00* (2006.01)
*C22C 9/04* (2006.01)

(52) U.S. Cl.
CPC ........... *B22D 27/04* (2013.01); *B22D 27/045* (2013.01); *B32B 15/015* (2013.01); *C22C 1/00* (2013.01); *C22C 1/02* (2013.01); *C22C 9/01* (2013.01); *C22C 9/02* (2013.01); *C22C 9/04* (2013.01); *C22C 9/05* (2013.01); *C22C 9/06* (2013.01); *C22C 9/10* (2013.01); *F16C 33/12* (2013.01); *F16C 33/121* (2013.01); *F16C 33/14* (2013.01); *F16C 2204/18* (2013.01)

(56) References Cited

FOREIGN PATENT DOCUMENTS

| | | |
|---|---|---|
| JP | 2011-174118 A | 9/2011 |
| JP | 2012-207277 A | 10/2012 |
| JP | 2013-043997 A | 3/2013 |
| WO | 2010030031 A1 | 3/2010 |

* cited by examiner

SLIDE MATERIAL AND METHOD FOR MANUFACTURING SAME, AND SLIDE MEMBER

TECHNICAL FIELD

The present invention relates to a sliding material, specifically a sliding material including a copper alloy layer on a substrate, the copper alloy layer having a structure including Bi phases dispersed in a copper alloy matrix. Furthermore, the present invention also relates to a method of manufacturing the sliding material, and to a sliding member including the sliding material.

BACKGROUND ART

A Cu—Sn—Pb-based sliding alloy has been used as a sliding material for a sliding bearing used for an internal combustion engine and various sliding members such as a bush or a thrust washer. However, in view of adverse effects of Pb on environment, a sintered copper alloy added with Bi, instead of Pb, has been proposed to achieve a Pb-free alloy. It has been known that Bi is dispersed in a Cu alloy matrix to form soft Bi phases to improve seizure resistance.

For example, JP 2001-81523A (Patent Literature 1) discloses a copper-based sliding material including a Cu—Sn alloy including 1 to 20 mass % of Bi and 0.1 to 10 volume % of hard particles having an average particle size of 1 to 45 μm. According to JP 2001-81523A, soft Bi phases dispersed in a Cu alloy matrix improves conformability, foreign matter embedding performance, and seizure resistance. Furthermore, JP 2001-81523A discloses that, due to the hard particles mixed in the Bi phases, increased wear resistance and seizure resistance are achieved, and the soft Bi phases function as a cushion to mitigate impact of an attack on a counter material.

JP 2012-207277A (Patent Literature 2) discloses a copper-based sliding material including 6 to 12 mass % of Sn, 11 to 30 mass % of Bi, and 0.01 to 0.05 mass % of P, in order to prevent coarsening of Bi particles in a Cu alloy layer produced by a continuous sintering process and to provide increased fatigue resistance and seizure resistance. According to JP 2012-207277A, a mass ratio between Bi and Sn in the Cu alloy layer is determined such that Bi/Sn=1.7 to 3.4 and a mass ratio between Bi and P in the Cu alloy layer is determined such that Bi/P=500 to 2100, thereby a Cu—Sn—P-based compound is precipitated in a Cu alloy powder during a cooling step after sintering. It leads to reduced difference in heat shrinkage rate between the Cu alloy and a Bi liquid phase in the Cu alloy powder, and thus the Bi liquid phase remains in the Cu alloy powder and prevents coarsening of the Bi particles. This enables the Bi particles to be finely dispersed so that an average particle area of the Bi particles is 60 to 350 μm².

CITATION LIST

PATENT LITERATURE 1: JP 2001-81523A
PATENT LITERATURE 2: JP 2012-207277A

SUMMARY OF THE INVENTION

Such a sliding material including a copper alloy including Bi is manufactured by sintering a copper alloy powder scattered on a substrate. In the case, Bi is melted during a temperature rise in a first sintering step, and the molten Bi starts to flow before copper alloy particles are bonded to each other. A part of Bi melted at an early stage during the first sintering step flows down to an interface between the copper alloy powder and the substrate through a gap between the copper alloy particles, and is accumulated at the interface. Accordingly, a region with high Bi concentration is formed at the bonding interface in the first sintering step. Even though subsequent steps are performed, Bi phases formed at the bonding interface during the first sintering step remain at the bonding interface and it is difficult to remove them. As a result, a bonding area between the copper alloy and the substrate becomes small. Since the Bi phases are soft and have low strength, bonding strength between the copper alloy and the substrate as a whole becomes low. Thus, it is difficult to ensure material strength. In particular, when, a copper alloy layer is directly bonded to a substrate without an intermediate layer for reducing manufacturing cost, Bi thus tends to inhibit bonding between the copper alloy layer and the substrate.

In recent years, a load applied on a bearing has been increased since an engine power has been increased or a bearing area has been reduced due to engine downsizing. Therefore, improvement of strength of a sliding material has been required. This requires not only strengthening of an alloy itself but also increase of bonding strength between an alloy layer and a substrate.

An object of the present invention is to provide a method for improving bonding strength between the copper alloy layer and the substrate when a layer including a copper alloy including Bi is formed on a substrate. Furthermore, an object of the present invention is to provide a sliding material having increase bonding strength between a copper alloy layer including Bi and a substrate, and provide a sliding member made from the sliding material.

As described above, a factor that reduces the bonding strength between the copper alloy layer including Bi and the substrate is Bi positioned at the bonding interface. According to the present invention, therefore, the bonding strength between the substrate and the copper alloy layer is improved by reducing Bi phases in contact with the bonding interface.

According to an aspect of the present invention, provided is a sliding material including a substrate and a copper alloy layer bonded to the substrate. The copper alloy layer includes a copper alloy including 4.0 to 25.0 mass % of Bi. The copper alloy has a structure in which Bi phases are dispersed in a copper alloy matrix. An area ratio (contact area ratio) of the Bi phases of the copper alloy layer at a bonding surface with the substrate is not more than 2.0%.

According to the present invention, since the area of the Bi phases in contact with the bonding interface is reduced, the bonding area between the substrate and the copper alloy layer is increased, and this provides a sliding material having good bonding strength.

According to an embodiment, the contact area ratio (%) of the Bi phases at the bonding interface satisfies following relationship:

$$\text{contact area ratio/Bi content} \leq 0.075$$

where the Bi content is represented by mass %.

According to an embodiment, the copper alloy includes:
4.0 to 25.0 mass % of Bi;
a total amount of not more than 50.0 mass % one or more selected from Sn, Al, Zn, Mn, Si, Ni, Fe, P, Zr, Ti and Mg; and
the balance of copper and inevitable impurities.

The copper alloy may further include a total amount of not more than 10 volume % of either or both of $MoS_2$ and graphite.

According to an embodiment, the sliding material may further include an overlay on the copper alloy layer.

According to an embodiment, the substrate has a thickness of 1.0 to 25.0 mm, and the copper alloy layer has a thickness of 0.1 to 3.0 mm.

The substrate is preferably made of: an iron-based material such as hypoeutectoid steel, eutectoid steel, hypereutectoid steel, cast iron, high-speed steel, tool steel, austenitic stainless steel or ferrite stainless steel; or a copper-based material such as pure copper, phosphor bronze, brass, chromium copper, beryllium copper or Corson alloy.

According to another aspect of the present invention, provided is a method of manufacturing the above sliding material. The method includes: preparing the substrate; melting the copper alloy; casting the molten copper alloy on a surface of the substrate to be bonded to the copper alloy; and cooling the substrate by a coolant from a surface of the substrate opposite to the bonding surface so that the copper alloy is unidirectionally solidified.

According to an embodiment, the method further includes reducing an amount of the supplied coolant, after a predetermined time from the casting.

According to an embodiment, the coolant may be water or oil.

According to an embodiment, the preparing of the substrate includes forming one or more substrate materials into a cylindrical body substrate, and the casting of the molten copper alloy includes casting the molten copper alloy in the cylindrical substrate while rotating the cylindrical substrate around its center axis.

According to still another aspect of the present invention, provided is a sliding member manufactured from the above sliding material. For example, the sliding member may be a bearing such as a sliding bearing, or may be a sliding member such as a bush or a thrust washer.

The features and advantages of the present invention will be described in more detail below with reference to the accompanying drawings. The drawings show non-limiting embodiments merely as examples.

DETAILED DESCRIPTION OF THE INVENTION

Figure 1:
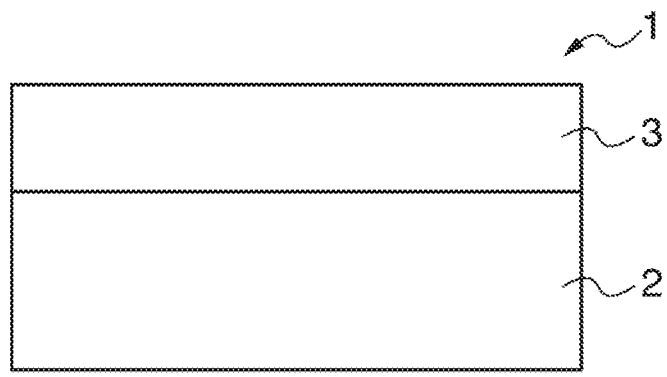
FIG. 1 is a cross-sectional schematic diagram of an example of a sliding material according to the present invention.

FIG. 1 schematically shows a cross section of an example of a sliding material 1 according to the present invention. The sliding material 1 is configured such that a copper alloy layer 3 is formed on a substrate 2. In FIG. 1, the copper alloy layer 3 is directly formed on the substrate 2.

The substrate 2 supports the copper alloy layer 3 to ensure strength of the sliding material 1. For example, the substrate 2 may be made of: a commercially available iron-based material such as hypoeutectoid steel, eutectoid steel, hypereutectoid steel, cast iron, high-speed steel, tool steel, austenitic stainless steel or ferrite stainless steel; or a copper-based material such as pure copper, phosphor bronze, brass, chromium copper, beryllium copper, or Corson alloy. However, the substrate 2 may be made of other materials.

The copper alloy layer 3 functions as a sliding layer, and includes a copper alloy including 4.0 to 25.0 mass % of Bi in relation to a mass of the entire copper alloy. In addition to Bi, the copper alloy may include a total amount of not more than 50.0 mass % of one or more selected from Sn, Al, Zn, Mn, Si, Ni, Fe, P, Zr, Ti and Mg. Furthermore, the copper alloy may include a total amount of not more than 10 volume % of either or both of $MoS_2$ and graphite. Furthermore, hard particles such as a metal boride, silicide, oxide, nitride or carbide, or intermetallic compound, or the like may be dispersed in the copper alloy. For example, the copper alloy may be, but not limited to, a copper alloy including 4.0 to 25.0 mass % of Bi, not more than 12.0 mass % of Sn, not more than 40.0 mass % of Zn, and not more than 13.0 mass % of Al.

The sliding material is preferably configured such that the substrate has a thickness of 1.0 to 25.0 mm and the copper alloy layer has a thickness of 0.1 to 3.0 mm.

Furthermore, the sliding material 1 according to the present invention may include an overlay on the copper alloy layer 3. For example, the overlay may include a well-known material such as a soft metal layer including Sn, Bi or the like or a resin in which a solid lubricant is dispersed.

Figure 2:
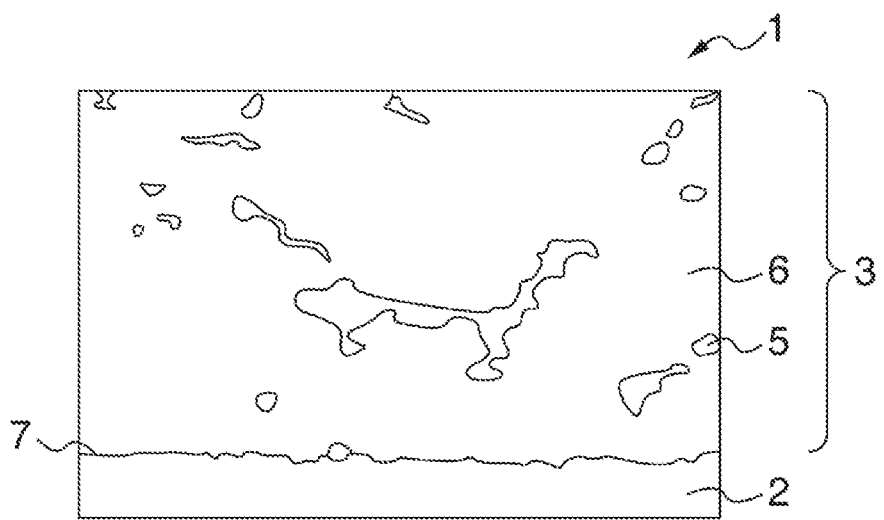
FIG. 2 is a schematic diagram of a cross-sectional structure of a copper alloy layer near a boundary between the copper alloy layer and a substrate of the sliding material according to the present invention.

FIG. 2 shows a schematic diagram of a cross-sectional structure of the copper alloy layer 3 near a boundary between the copper alloy layer 3 and the substrate 2 of the sliding material 1 according to the present invention.

Since copper and Bi are not solid-solved in each other, copper and Bi are completely separated. Thus, as shown in FIG. 2, the copper alloy layer 3 has such a structure that Bi phases 5 are dispersed in a form of islands in grain boundaries of a copper alloy matrix 6. The Bi phases are composed of almost pure Bi. In some cases, however, alloying elements included in the copper alloy are solid-solved in Bi.

According to the present invention, an amount of the Bi phases 5 precipitated in the copper alloy layer 3 is small in the vicinity of a bonding interface 7 between the copper alloy layer 3 and the substrate 2. In particular, a contact area ratio, that is a ratio of an area of the pure Bi phases in contact with the bonding interface 7 in relation to an entire area of the bonding interface 7, is not more than 2.0%, and more preferably 0.2 to 1.2%.

Furthermore, the contact area ratio of the Bi phases depends on a Bi content in the copper alloy. Thus, in order to eliminate the influence of the Bi content, the contact area ratio is preferably not exceed a value obtained by multiplying the Bi content (mass %) by a coefficient of 0.075. More preferably, the coefficient is not more than 0.060.

The Bi phases have low strength and inhibit bonding between the copper alloy layer 3 and the substrate 2 at the bonding interface 7. In the sliding material according to the present invention, few Bi phases are positioned at the bonding interface 7, and thus a contact area between the copper alloy layer 3 and the substrate 2 is increased. Accordingly, bonding strength between the copper alloy layer 3 and the substrate 2 is improved, and this can improve strength of the sliding material 1 as a whole.

Furthermore, in the present embodiment, the copper alloy layer is directly bonded to the substrate. Thus, there is no need to use an expensive copper-plated steel material, and it can reduce cost of the sliding material.

A composition of the copper alloy will be described below.

Bi: 4.0 to 25.0 Mass %

Bi forms soft Bi phases dispersed in the copper alloy matrix, and contributes to improvement of wear resistance and seizure resistance. If the copper alloy includes less than 4.0 mass % of Bi, the effect of increasing the seizure resistance can not be obtained. If the copper alloy includes more than 25.0 mass % of Bi, strength of the copper alloy is reduced since Bi itself has low strength. The copper alloy preferably includes 8.0 to 20.0 mass % of Bi.

Total Amount of not More than 50.0 Mass % of One or More Selected from Sn, Al, Zn, Mn, Si, Ni, Fe, P, Zr, Ti and Mg These elements have an effect of providing solid-solution strengthening of a Cu matrix of the copper alloy or an effect of improving strength of the copper alloy by forming an intermetallic compound. Thus, when the copper alloy includes not more than 50 mass % of the above elements, the elements can contribute to improvement of strength of the sliding material. However, if the copper alloy includes a large amount of the above elements, the amount of intermetallic compound becomes excessively large, and this increases brittleness of the copper alloy. Accordingly, the above elements may be included in the copper alloy up to 50 mass %. The copper alloy preferably includes not less than 3.0 mass % but not more than 40.0 mass % of the above elements.

The copper alloy may include a solid lubricant. The copper alloy may further include a total amount of not more than 10 volume % of solid lubricant composed of either or both of $MoS_2$ and graphite. A lubricating property of the solid lubricant can improve wear resistance and seizure resistance of the copper alloy layer. If the copper alloy includes a large amount of the solid lubricant, strength of the copper alloy is reduced. Accordingly, the solid lubricant may be included in the copper alloy up to 10 volume %. The copper alloy preferably includes up to 5.0 volume % of the solid lubricant.

Furthermore, the copper alloy may include 1.0 to 10.0 volume % of hard particles. The hard particles preferably have a size of 1 to 45 μm, and may be composed of a metal boride, silicide, oxide, nitride or carbide, or intermetallic compound. The hard particles may present in the Bi phases in the copper alloy layer, and can improve wear resistance and seizure resistance.

A method of manufacturing the sliding material 1 of the present invention will be described below. In the present invention, a copper alloy having the above composition in a molten state is cast on the substrate 2, and thus the molten copper alloy is solidified directly in contact with the substrate 2. In the present invention, it is thus possible to manufacture the sliding material 1 by bonding the copper alloy layer 3 to the substrate 2 by the casting.

First, the substrate 2 is prepared. The substrate 2 may be a flat plate or a cylindrical body including the material described above. However, the substrate 2 may have a shape other than these shapes.

The copper alloy having the above-described composition is melted, and the molten copper alloy is cast on a bonding surface of the substrate surface 2. In this case, in order to prevent oxidation, the casting is preferably performed in an inert gas atmosphere or a reducing atmosphere, or by using a flux.

The substrate 2 is cooled by a coolant from a surface opposite to the surface to be bonded to the copper alloy layer 3 (bonding surface). For example, the coolant may be water or oil. The substrate 2 is cooled by colliding water or oil against the surface opposite to the bonding surface of the substrate 2.

By casting the copper alloy and cooling the substrate 2 in this manner, the copper alloy is unidirectionally solidified from a region in contact with the bonding surface of the substrate 2. In the present embodiment, the substrate 2 is not cooled from a free surface side (corresponding to an opposite side of a bonding surface of the copper alloy layer) of the copper alloy.

When a temperature of a Cu—Bi alloy in a molten state is lowered, Cu starts to primarily crystallize, so that Bi is concentrated in a Cu—Bi liquid phase. Then, at approximately 270° C., the remaining Cu—Bi liquid phase is solidified. However, since Cu and Bi are hardly solid-solved in each other, Cu and Bi are separated into a Cu phase and Bi phases, respectively. Accordingly, a structure in which the Bi phases are dispersed in the Cu phase is obtained.

In the method of the present invention, the solidification starts from the copper alloy in contact with the bonding surface of the cooled substrate 2. Thus, primary crystal Cu crystallizes in the vicinity of the bonding surface of the substrate 2, and a sub-component Bi remains in the liquid phase and moves from the bonding interface side to the liquid phase side. As a result, when the copper alloy layer 3 is formed, Bi phases in contact with the bonding interface 7 between the copper alloy layer 3 and the substrate 2 are relatively few.

Thus, in the present invention, since the copper alloy is unidirectionally solidified from the bonding surface of the substrate 2, the vicinity of the bonding interface is rapidly solidified, and the vicinity of a sliding surface opposite to the bonding interface of the copper alloy layer 3 is slowly cooled. This enables the contact area ratio of the Bi phases in contact with the bonding interface to be not more than 2.0%.

Furthermore, as compared with a sintering method of powder alloys, lining of the copper alloy by the casting method can ensure alloy strength sufficient for the copper alloy layer since the entire alloy is melted to form a matrix in the casting method.

Figure 3:
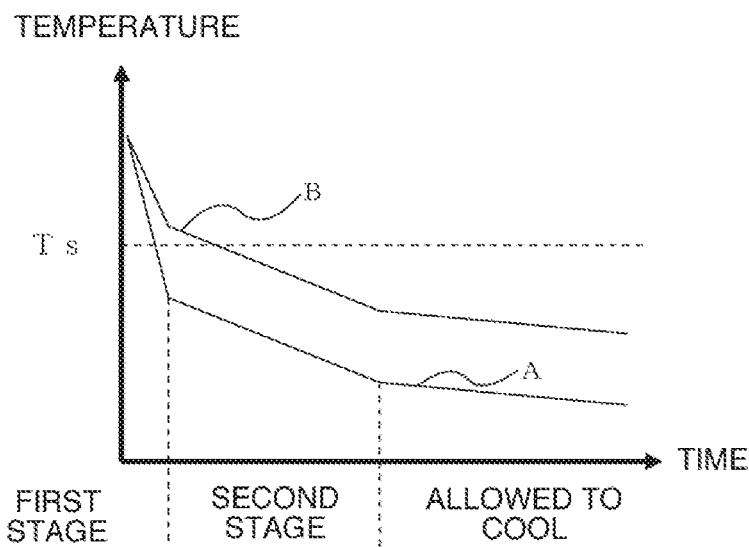
FIG. 3 shows an example of a cooling step in a method of manufacturing the sliding material according to the present invention.

According to the present invention, it is possible to perform structure control by controlling an amount of coolant supplied to the surface opposite to the bonding surface of the substrate 2 during a solidification step. For example, FIG. 3 shows an example of a cooling condition. A lateral axis indicates time from start of the casting, and a longitudinal axis indicates a temperature of the bonding surface (A) of the copper alloy layer and the sliding surface (B) which is the free surface of the copper alloy layer. At an early stage of cooling (first stage), the amount of supplied coolant is set to be large and cooling time is set to be short (e.g., a flow rate of cooling water colliding against the substrate is set to be not less than 0.400 L/min per 1 $cm^2$ of the substrate; and the cooling time is set to be 1.0 to 8.0 seconds per 1 mm thickness of the substrate). At a second stage subsequent to the first stage, the amount of supplied coolant is set to be small and the cooling time is set to be long (e.g., the flow rate of the cooling water colliding against the substrate is set to be not more than 0.100 L/min per 1 $cm^2$ of the substrate). After the second stage, the substrate is allowed to cool. At a final phase of the first stage, the bonding surface of the copper alloy layer has a temperature lower than a solidification start temperature Ts of the copper alloy, and solidification is started. However, the sliding surface still has a temperature higher than Ts and thus remains molten. At the second stage, the sliding surface is also slowly solidified. This control enables a reduction in the contact area ratio of the Bi phases in contact with the bonding interface, and allows the Bi phases to be almost uniformly dispersed in the form of islands in a region that extends to the sliding surface and is separated from the bonding interface. By adjusting the amount of supplied coolant, a size of the Bi phases may be increased as the Bi phases are closer to the sliding surface. Such a cooling condition enables control of the structure and a thickness ratio.

In a conventional casting method, the cooling has been performed from the sliding surface side of the copper alloy layer, i.e., the surface opposite to the bonding interface, and thus the copper alloy has continuously been solidified from the surface in a thickness direction. In the conventional method, fewer Bi phases are formed on the sliding surface side and more Bi phases are precipitated on the bonding interface side.

As an embodiment of the method according to the present invention, it is possible to locate a weir on a surface of a flat substrate and a molten copper alloy is poured on the substrate surface surrounded by the weir. In this case, in order to prevent oxidation of the substrate and the copper alloy, the pouring of the molten copper alloy is preferably performed in an inert gas atmosphere or a reducing atmosphere or by using a flux. After the pouring, the substrate is cooled by the coolant from a back side of the substrate.

As another embodiment, centrifugal casting may also be employed. Of course, the present invention is not limited to these casting methods.

Figure 4:
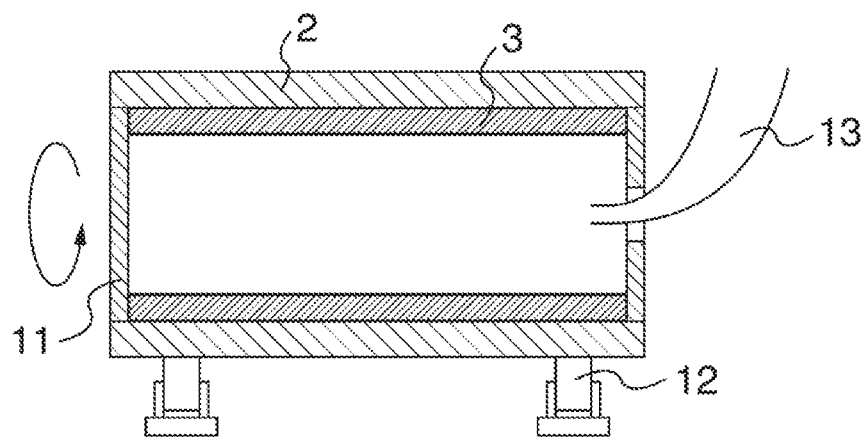
FIG. 4 is a schematic diagram showing a centrifugal casting method.

FIG. 4 shows a schematic diagram of a centrifugal casting method. A plate 2 for a substrate is formed into a cylindrical shape, and both ends of the substrate is sealed 11. The substrate 2 formed into a cylindrical shape is horizontally rotated at a high speed, for example, by a rotating device 12 such as a rotating roller. An inside of the cylindrical portion of the substrate 2 is preferably under a vacuum atmosphere, a reducing atmosphere, or an inert gas atmosphere. A molten copper alloy is poured from a gate 13 located at the end of the cylindrical portion of the substrate. The substrate 2 is cooled by supplying a coolant from an outer surface. The molten copper alloy is in close contact with an inner surface of the substrate 2 by centrifugal force. The molten copper alloy is solidified to form a copper alloy layer, while its internal shape remains a perfect circle. For example, the centrifugal casting method is applicable to a cylindrical sliding bearing and the like.

Measuring of a contact area ratio of Bi phases at the bonding interface between the copper alloy layer and the substrate will be described. A cross-sectional structure of the sliding material is observed with use of an optical microscope or an electron microscope (e.g. at a magnification of 200 times) to determine the bonding interface between the substrate and the copper alloy layer. A contact distance of Bi phases in contact with the bonding interface within a predetermined length of the interface is measured. Then, a contact area ratio of the Bi phases is evaluated by a segment ratio that is a ratio of a total contact distance of the Bi phases in relation to the predetermined length of the bonding interface.

Examples

Samples of Examples 1 to 19 and Comparative Examples 1 to 5 below were produced, and a contact area ratio and bonding strength were measured for each sample.

Preparation of Substrate

A SPCC steel plate was used as a substrate. A center portion of an upper surface of the steel plate was cut off while a periphery of the steel plate was left in order to prevent leakage of a molten alloy. Thus, the steel plate was processed into a box shape having a weir formed at the periphery. A casting thickness was set to 5 mm A portion to be a substrate of a sliding member had a thickness of 6 mm A surface of the substrate was covered with molten borax as an antioxidant, and the substrate was preheated at 1000° C. to 1200° C. in a reducing gas atmosphere including $H_2$ gas.

Casting of Copper Alloy

As a copper alloy, materials including pure copper, pure Bi, and optionally other components were prepared so as to have compositions of Examples 1 to 19 and Comparative Examples 1 to 5 shown in Tables 1 and 2. Then, the copper alloy was melted in the air. The molten copper alloy was maintained at 1100° C. to 1200° C. in the air, and was poured on the preheated substrate.

Cooling Step

After the pouring of the molten copper alloy, cooling water was collided against the bottom surface of the substrate from a water sprinkling nozzle located under the substrate. In Comparative Examples, cooling water was collided continuously against the bottom surface of the substrate with a constant small flow rate (cooling at a cooling water flow rate of 40 L/min for 180 seconds). On the other hand, in Examples 1 to 5 and 11 to 19, a discontinuous two-stage cooling condition, as shown in FIG. 3, was applied. At an early stage of the cooling (at a first stage), an amount of cooling water was larger and a cooling time was shorter (a cooling water flow rate of 130 L/min for 20 seconds) than in Comparative Examples, and after the early stage of cooling (at a second stage), the amount of cooling water was smaller and the cooling time was longer (a cooling water flow rate of 20 L/min for 60 seconds) than at the first stage. After the two-stage cooling step, the substrate was allowed to cool in the air to be slowly cooled to a room temperature. In Examples 6 to 10, the amount of cooling water at the first stage was larger (a cooling water flow rate of 180 L/min for 15 seconds) than in Examples 1 to 5 and 11 to 19 to increase a cooling effect. The condition from the second stage was the same as that in Examples 1 to 5 and 11 to 19.

Evaluation of Contact Area Ratio

A cross section was observed with use of an optical microscope or reflected electron composition images, and cross-sectional structure images (a field view of 234 μm in length*334 μm in width) were taken at not less than 10 portions of the cross section for each sample. The images were taken so that a boundary line between the copper alloy and the substrate was parallel to a lateral direction. In the cross-sectional structure images, a length of the boundary line was measured. Furthermore, a length of a portion at which an outline of each of Bi phases distributed in the copper alloy structure overlapped with the boundary line, i.e., a length of a contact line between each of the Bi phases and a bonding interface was measured, and the lengths of the contact lines were summed up. Values of the total of the lengths of the contact lines/the length of the boundary line obtained from the measured portions were averaged, and the averaged value was evaluated as a contact area ratio.

Furthermore, a ratio of the contact area ratio (area %) in relation to a Bi content (mass %) (contact area ratio/Bi content) was also evaluated.

Measurement of Bonding Strength

Bonding strength between the copper alloy layer and the substrate was evaluated on the basis of a ratio of shear strength between the copper alloy layer and the substrate in relation to tensile strength of the copper alloy (shear strength/tensile strength). Since the shear strength is influenced by the tensile strength, the ratio of shear strength/tensile strength was used as an indicator of the bonding strength, so that materials including different components can be compared.

Figure 5:
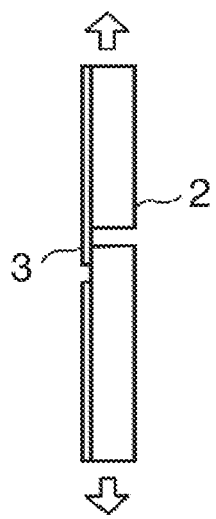
FIG. 5 is a schematic diagram of a shearing test.

The shear strength is obtained as follows: a specimen is worked such that a copper alloy layer is bonded to a substrate with a predetermined bonding area as shown in FIG. 5; a tensile load (tensile force) is applied to both ends of the specimen; and a maximum tensile stress at which the bonded portion breaks is determined as the shear strength (see JP 2002-224852A).

Table 1 shows measurement results of the contact area ratio (area %), the ratio of the contact area ratio (area %) in relation to the Bi content (mass %), and the bonding strength (shear strength/tensile strength) when Bi in the Cu—Bi alloy was varied from 4.0 mass % to 25.6 mass %, respectively in columns "Contact area ratio (%)", "Contact area ratio/Bi content", and "Shear strength/Tensile strength".

As described above, the cooling condition is different between Comparative Examples 1 to 5, Examples 1 to 5, and Examples 6 to 10. The results in Table 1 show that when the alloy compositions were same, the contact area ratio greatly varied depending on the cooling condition. The contact area was smallest in Examples 6 to 10 in which the substrate was greatly cooled. Thus, control of the cooling condition enables the contact area ratio to be not more than 2.0 area %, regardless of the Bi content of the alloy. Under the cooling condition in Comparative Examples 1 to 5, the contact area ratio was not less than 3.70 area %.

Under the same cooling condition, the contact area was increased as the Bi content was increased. However, the value of contact area ratio/Bi content was approximately uniform even when the Bi content varied.

Figure 6:
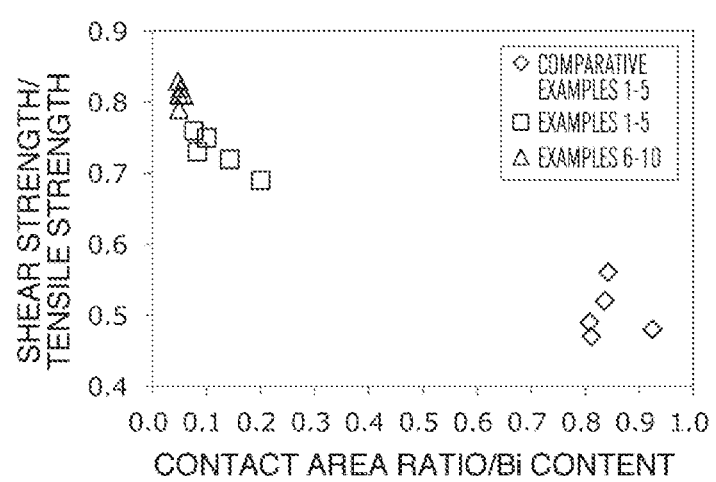
FIG. 6 shows a relationship between a value of (contact area ratio/Bi content) and a value of (shear strength/tensile strength).

With regard to the shear strength in Examples 1 to 10 in which the contact area ratio was not more than 2.0%, the value of shear strength/tensile strength was not less than 0.7, which was much higher than the value in Comparative Examples 1 to 5. FIG. 6 shows a relationship between the value of the contact area ratio per Bi content (contact area ratio (%)/Bi content (mass %)) and the value of shear strength/tensile strength. FIG. 6 shows that the value of contact area ratio/Bi content highly correlates with the value of shear strength/tensile strength. When the value of contact area ratio/Bi content was not more than 0.075 (Examples 6 to 10), in particular, the value of shear strength/tensile strength was approximately not less than 0.8, and excellent bonding strength was obtained.

TABLE 1

| No. | Alloy composition (mass %) Cu | Alloy composition (mass %) Bi | Contact area ratio (%) | Contact area ratio/Bi content | Shear strength/ Tensile strength |
|---|---|---|---|---|---|
| Comparative Example 1 | Balance | 4.0 | 3.70 | 0.925 | 0.48 |
| Comparative Example 2 | Balance | 9.8 | 8.20 | 0.837 | 0.52 |
| Comparative Example 3 | Balance | 14.9 | 12.10 | 0.812 | 0.47 |
| Comparative Example 4 | Balance | 20.4 | 17.20 | 0.843 | 0.56 |
| Comparative Example 5 | Balance | 25.6 | 20.70 | 0.809 | 0.49 |
| Example 1 | Balance | 4.0 | 0.80 | 0.200 | 0.69 |
| Example 2 | Balance | 9.8 | 1.40 | 0.143 | 0.72 |
| Example 3 | Balance | 14.9 | 1.50 | 0.101 | 0.75 |
| Example 4 | Balance | 20.4 | 1.70 | 0.083 | 0.73 |
| Example 5 | Balance | 24.8 | 1.90 | 0.077 | 0.76 |
| Example 6 | Balance | 4.0 | 0.20 | 0.050 | 0.79 |
| Example 7 | Balance | 9.8 | 0.57 | 0.058 | 0.81 |
| Example 8 | Balance | 14.9 | 0.79 | 0.053 | 0.82 |
| Example 9 | Balance | 20.4 | 1.02 | 0 050 | 0.81 |
| Example 10 | Balance | 24.8 | 1.20 | 0.048 | 0.83 |

In Examples 11 to 19, other alloy elements (Sn, Zn, Al, Fe, Ni, Mn, Si, P, Zr, Ti or Mg), hard particles $Mo_2C$, or solid lubricant particles graphite (Gr) were added to the alloy composition (Cu-about 15% of Bi) of Example 3. The cooling condition in Example 11 to 19 was the same as that in Example 3.

Table 3 shows test results. Table 3 shows that even when the above additive components were added, the contact area ratio was in the range of 1.28% to 1.78%, which was equivalent to the contact area ratio of 1.50% in Example 3, and the value of contact area ratio/Bi content was 0.086 to 0.0119, which was equivalent to the value of 0.101 in Example 3. Accordingly, the bonding strength (shear strength/tensile strength) was 0.69 to 0.76, which was almost the same as 0.75 in Example 3. These results show that the influence of the additive components on the contact area ratio and the bonding strength was small.

TABLE 2

| No. | Alloy composition (mass % or volume %*) Cu | Alloy composition (mass % or volume %*) Bi | Alloy composition (mass % or volume %*) Others | Contact area ratio (%) | Contact area ratio/ Bi content | Shear strength/ Tensile strength |
|---|---|---|---|---|---|---|
| Comparative Example 3 | Balance | 14.9 | — | 12.10 | 0.812 | 0.47 |
| Example 3 | Balance | 14.9 | — | 1.50 | 0.101 | 0.75 |
| Example 11 | Balance | 14.9 | Sn: 10.1 | 1.62 | 0.109 | 0.72 |
| Example 12 | Balance | 14.7 | Zn: 20.4 | 1.34 | 0.091 | 0.76 |
| Example 13 | Balance | 14.8 | Al: 5.8, Fe: 1.0 | I.28 | 0.086 | 0.76 |
| Example 14 | Balance | 14.9 | Ni: 6.1 | 1.78 | 0.119 | 0.69 |
| Example 15 | Balance | 14.6 | Mn: 2.9, Si: 1.3 | 1.49 | 0.102 | 0.74 |
| Example 16 | Balance | 15.9 | Fe: 0.9, P: 0.2 | 1.34 | 0.084 | 0.72 |
| Example 17 | Balance | 15.6 | Zr: 0.05, Ti: 0.05, Mg: 0.05 | 1.51 | 0.097 | 0.75 |

TABLE 2-continued

| No. | Alloy composition (mass % or volume %*) | | | Contact area ratio (%) | Contact area ratio/ Bi content | Shear strength/ Tensile strength |
|---|---|---|---|---|---|---|
| | Cu | Bi | Others | | | |
| Example 18 | Balance | 15.0 | Mo2C: 1.1 volume % | 1.71 | 0.114 | 0.73 |
| Example 19 | Balance | 14.7 | Gr: 3.2 volume % | 1.39 | 0.095 | 0.76 |

*Values without "volume %" in Alloy component are represented by "mass %".

REFERENCE SIGNS LIST

1: Sliding material
2: Substrate
3: Copper alloy layer
5: Bi phase
6: Matrix
7: Bonding interface
11: Seal
12: Rotating device
13: Gate

The invention claimed is:

1. A sliding material comprising:
a substrate; and
a copper alloy layer bonded to the substrate,
wherein the copper alloy layer comprises a copper alloy including 4.0 to 25.0 mass % of Bi, the copper alloy having a structure in which Bi phases are dispersed in a copper alloy matrix, and
wherein a contact area ratio of the Bi phases at a bonding interface with the substrate is not more than 2.0%.

2. The sliding material according to claim 1, wherein the contact area ratio of the Bi phases satisfies:
contact area ratio/Bi content≤0.075,
where the Bi content is represented by mass %.

3. The sliding material according to claim 1, wherein the copper alloy includes:
4.0 to 25.0 mass % of Bi,
a total amount of not more than 50.0 mass % one or more selected from Sn, Al, Zn, Mn, Si, Ni, Fe, P, Zr, Ti and Mg, and
the balance of copper and inevitable impurities.

4. The sliding material according to claim 1, wherein the copper alloy further includes a total amount of not more than 10 volume % of either or both of $MoS_2$ and graphite.

5. The sliding material according to claim 1, further comprising an overlay on the copper alloy layer.

6. The sliding material according to claim 1,
wherein the substrate has a thickness of 1.0 to 25.0 mm, and
wherein the copper alloy layer has a thickness of 0.1 to 3.0 mm.

7. A method of manufacturing the sliding material according to claim 1, comprising:
preparing the substrate;
melting the copper alloy;
casting the molten copper alloy on a surface of the substrate to be bonded to the copper alloy; and
cooling the substrate by a coolant from a surface of the substrate opposite to the surface to be bonded so that the copper alloy is unidirectionally solidified.

8. The method according to claim 7, further comprising reducing an amount of the supplied coolant after a predetermined time from the casting.

9. The method 1 according to claim 7, wherein the coolant is water or oil.

10. The method according to claim 7,
wherein the preparing of the substrate includes forming one or more substrate materials into a cylindrical substrate, and
wherein the casting of the molten copper alloy includes casting the molten copper alloy in the cylindrical substrate while rotating the cylindrical substrate around its center axis.

11. A sliding member comprising the sliding material according to claim 1.

* * * * *